United States Patent [19]

Watanabe

[11] Patent Number: 5,317,629
[45] Date of Patent: May 31, 1994

[54] DATA COMMUNICATION APPARATUS CONNECTABLE WITH A PLURALITY OF TELEPHONE SETS AND A TELEPHONE LINE

[75] Inventor: Tsunehiro Watanabe, Tokyo, Japan

[73] Assignee: Canon Kabushiki Kaisha, Tokyo, Japan

[21] Appl. No.: 702,388

[22] Filed: May 20, 1991

[30] Foreign Application Priority Data

May 21, 1990 [JP] Japan ................................ 2-129122
Jun. 4, 1990 [JP] Japan ................................ 2-144405

[51] Int. Cl.[5] .......................................... H04M 11/00
[52] U.S. Cl. ..................................... 379/93; 379/100; 379/201; 379/210
[58] Field of Search .................. 379/102, 100, 94, 96, 379/97, 98, 93, 104, 105, 210, 211, 179, 182, 183

[56] References Cited

U.S. PATENT DOCUMENTS

| | | |
|---|---|---|
| 4,674,115 | 6/1987 | Kaleita et al. . |
| 4,677,660 | 6/1987 | Yoshida . |
| 4,800,439 | 1/1989 | Yoshino . |
| 4,809,317 | 2/1989 | Howe et al. . |
| 4,815,121 | 3/1989 | Yoshida . |
| 4,825,461 | 4/1989 | Kurita et al. . |
| 4,852,153 | 7/1989 | Streck . |
| 4,916,607 | 4/1990 | Teraichi et al. . |
| 4,932,048 | 6/1990 | Kenmochi et al. . |
| 4,937,857 | 6/1990 | Yamashita et al. ................ 379/210 |
| 4,953,199 | 8/1990 | Hoshi et al. ........................ 379/102 |
| 4,998,273 | 3/1991 | Nichols .............................. 379/102 |
| 5,020,096 | 5/1991 | Sakakibara et al. . |
| 5,036,534 | 7/1991 | Gural ................................. 379/100 |
| 5,048,076 | 9/1991 | Maurer et al. ...................... 379/102 |
| 5,086,458 | 2/1992 | Bowen ............................... 379/105 |
| 5,093,857 | 3/1992 | Yoshida et al. . |

Primary Examiner—Curtis Kuntz
Assistant Examiner—Stella L. Woo
Attorney, Agent, or Firm—Fitzpatrick, Cella, Harper & Scinto

[57] ABSTRACT

A communication apparatus selectively uses plural telephone sets and a line. The communication apparatus includes a circuit for detecting a calling signal from a line, and a control circuit for allowing a specific telephone set to receive an incoming call and ring among plural telephone sets on receipt of an incoming call.

11 Claims, 4 Drawing Sheets

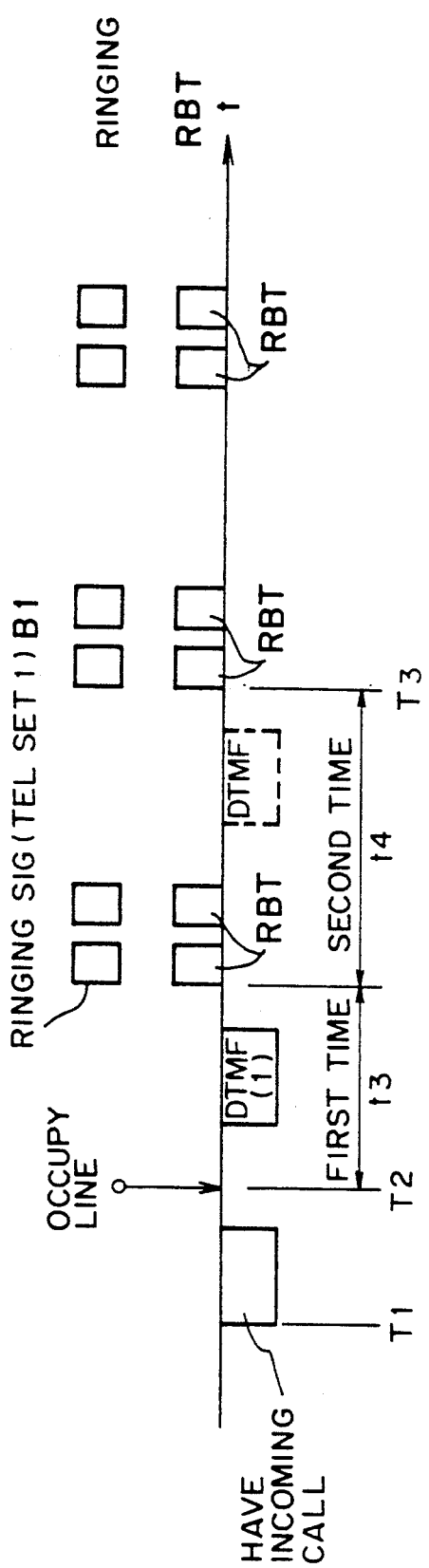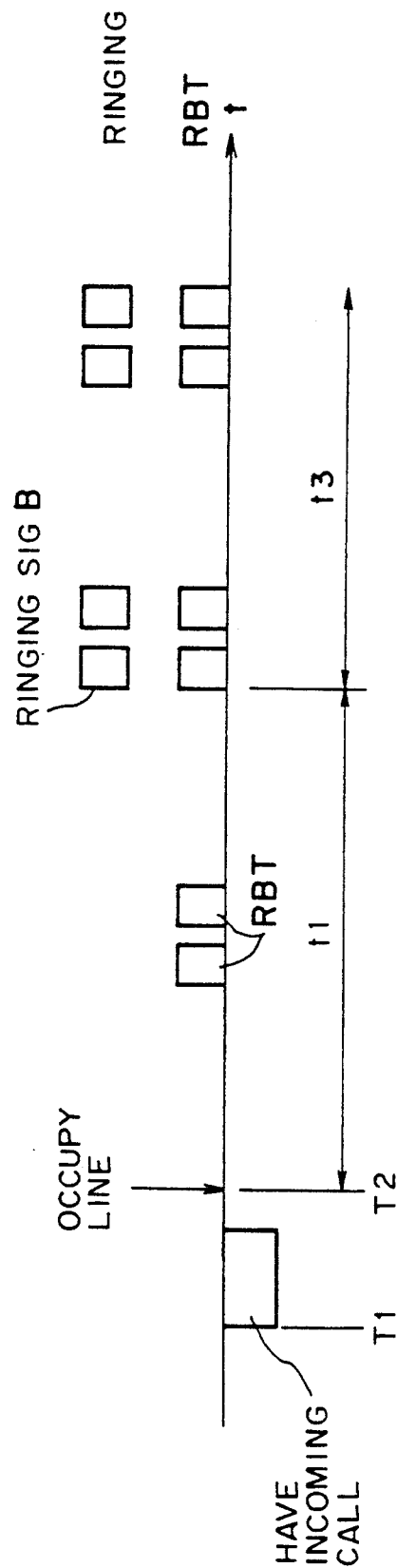
FIG. 2
FIG. 3

5,317,629

DATA COMMUNICATION APPARATUS CONNECTABLE WITH A PLURALITY OF TELEPHONE SETS AND A TELEPHONE LINE

BACKGROUND OF THE INVENTION

1. Field of the Invention

The present invention relates to a communication apparatus and, more particularly to a communication apparatus which is connected with a line together with telephone sets.

2. Related Background Art

As a communication apparatus, which can be connected with a telephone set through a telephone terminal, a facsimile apparatus, for example, has been known so far.

In this type of apparatus, singular or plural telephone sets are connected, and the line is jointly used by a facsimile apparatus and telephone sets by utilizing an outgoing and incoming control unit, a network control unit, etc. of the facsimile apparatus. As patents or patent applications for such an apparatus, U.S. Pat. No. 4,825,461; U.S. patent application Ser. Nos. 453,364 (refiled on Dec. 20, 1989); 106,783 (filed on Feb. 15, 1988); 470,461 (refiled on Mar. 13, 1991); and 465,652 (refiled on Jan. 22, 1990) have been filed.

When, however, a plurality of telephone sets are connected with the facsimile apparatus, there has been a problem that all telephone sets always ring even if one of the telephone sets is determined which is answered by an operator on receipt of an incoming call, and it is troublesome.

Also some facsimile apparatuses having an automatic TEL/FAC switching function are known in which whether the partner station is a voice terminal or facsimile terminal is automatically identified on receipt of an incoming call and the line is switched to either the facsimile apparatus or the telephone set accordingly. As patents concerning such an automatic TEL/FAX switching, U.S. Pat. Nos. 4,677,660; 4,815,121; 4,800,439; 4,932,048 and 4,916,607 have been issued.

Moreover, U.S. patent application Ser. No. 573,684 (filed on Aug. 28, 1990) has been filed for a new automatic TEL/FAX switching system, and this system is shown in FIG. 3.

In FIG. 3, a plurality of sub-telephone sets are connected with a facsimile (FAX) apparatus, which detects an incoming call. When the FAX apparatus detects a calling signal from the office exchange at time T1, the NCU of the FAX apparatus catches the line at time T2, and detects a received signal from the partner station while transmitting a ring back tone RBT during the consecutive period t1.

In the period t1, the FAX apparatus detects a procedure signal such as a voice signal or a FAX calling signal by frequency discrimination, etc. When a FAX procedure signal is detected, the FAX communication is started. When, on the other hand, a voice signal is detected or a FAX procedure signal cannot be detected within the period tl, all the connected telephone sets (1, 2) are called in a period t3 (for example, ball ringing B is executed).

A telephone line can be jointly used for both voice and data communications in the above system. But, in the case of the voice communication, it always takes a fixed time to switch to the telephone set, increasing the communication time and cost. Also when a plurality of telephone sets are connected, there is a problem in which all the telephone sets are called.

SUMMARY OF THE INVENTION

In view of the above-mentioned problems at issue, it is an object of the present invention to improve a communication apparatus.

It is a further object of the present invention to automatically identify a voice communication or a data communication on receipt of an incoming call, and at the same time, to enable the voice communication immediately.

It is also an object of the present invention to automatically identify a voice communication or a data communication on receipt of an incoming call, and at the same time, to enable a specific telephone set to be called among a plurality of telephone sets.

It is another object of the present invention to provide a communication apparatus, in which a data communication apparatus and a plurality of telephone sets selectively use a line, capable of selecting a telephone set which is allowed to ring on receipt of an incoming call.

Other objects of the present invention will be apparent from the following detailed description of embodiments and drawings.

BRIEF DESCRIPTION OF THE DRAWINGS

FIG. 2 is a view showing the procedure of an incoming call control in this example.

FIG. 3 is a view showing the procedure for automatic switching between a telephone set and FAX.

DESCRIPTION OF THE PREFERRED EMBODIMENTS

Figure 1:
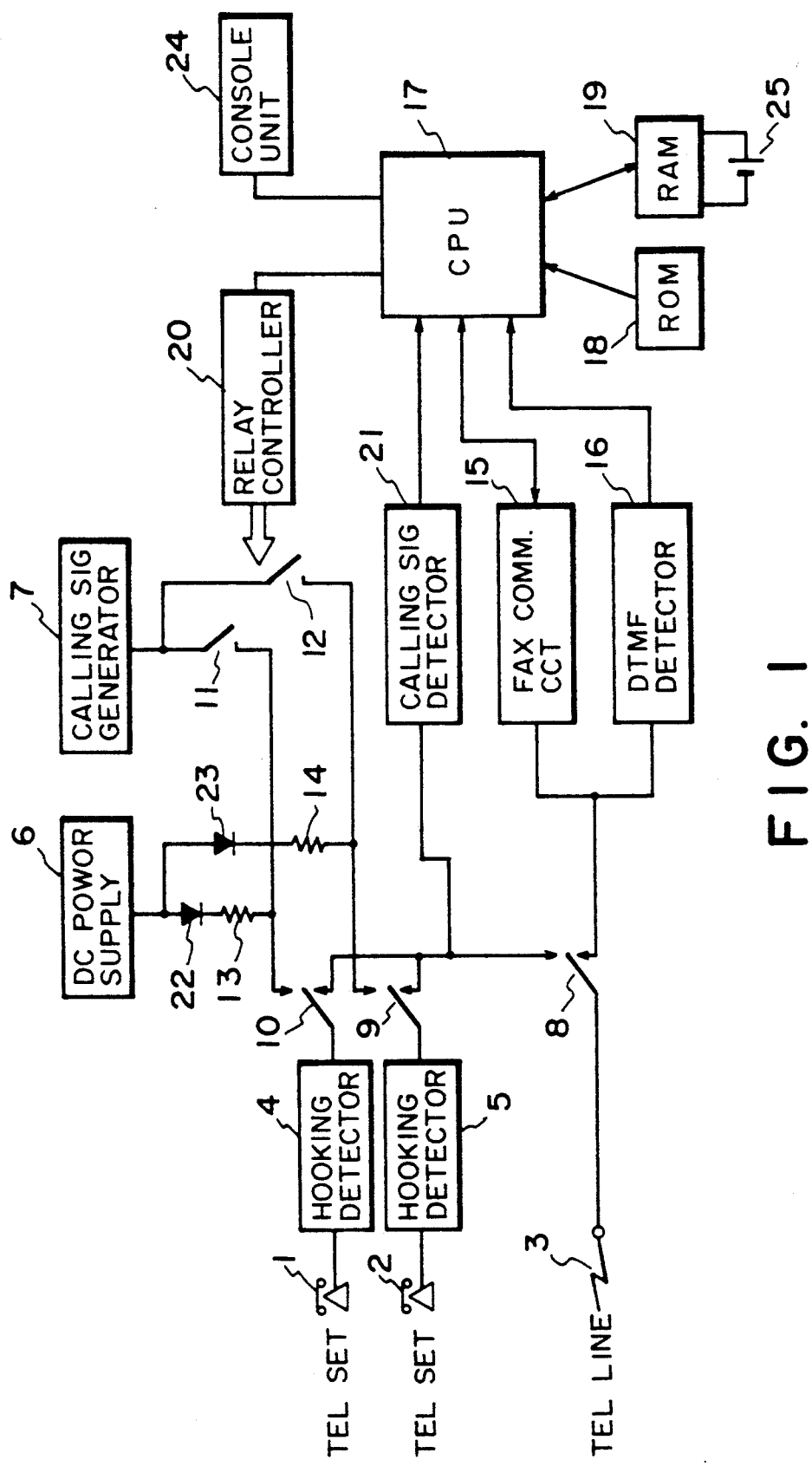
FIG. 1 is a block diagram showing a configuration of a FAX apparatus of an embodiment according to the present invention.

The present invention will hereinafter be described in detail with respect to embodiments thereof shown in the drawings.

FIG. 1 is a block diagram showing a configuration of a FAX apparatus according to an embodiment of the present invention.

A FAX apparatus in FIG. 1 is capable of connecting with a plurality of telephone sets 1 and 2, and has these telephone sets and one telephone line 3 jointly.

In FIG. 1, a FAX communication circuit 15 consists of a well-known image I/0 unit, MODEM, encoding/decoding unit, etc. Relays 8, 9 and 10, to control whether the telephone line 3 is connected with the telephone set 1, or 2, or the FAX communication circuit. A DTMF signal detector 16 controls a FAX communication circuit 15 in accordance with a DTMF signal on the line.

During stand-by, the relay 8 has been switched to the upper side contact in FIG. 1. A calling signal from the exchange is detected by a calling signal detector 21, and a CPU 17 controls the relays 8 to 10 in accordance with this state of detection to select the FAX communication circuit 15 or an appropriate telephone set 1 or 2 by means of the relays 9 or 10 for connection.

Hooking detectors 4 and 5, which detect the state of hooking of the telephone sets 1, 2, respectively. The detector 4 is connected in a line between the relay 10 and the telephone set 1, and the detector 5 is connected in a line between the relay 9 and the telephone set 2.

The relays 9 and 10 have been switched to the upper side contact during stand-by, and pulled up to a specified voltage supplied through diodes 22, 23 and resistances 13, 14 from a DC power supply 6, respectively.

A calling signal is input into either of the telephone sets 1 and 2 or both from a calling signal generator 7 through relays 11, 12 to ring a desired calling bell. During stand-by, the relays 11, 12 have been set to off, the telephone sets 1 and 2 are separated from the telephone line 3, and are supplied with a power from the DC power supply 6.

When a calling signal detector 21 has detected a calling signal from the exchange on receipt of an incoming call, the telephone set 1 or 2 (or both) is rung by the above-mentioned method. When a operator hooks up either telephone set 1 or 2 and answers the telephone set, the hooking detector 4 or 5 detects this, and a telephone set, which has answered through the relay 8 or 9, is connected with the telephone line 3 to enable speech communication.

Relay control on receipt of an incoming call is performed by the CPU 17 consisting of a microprocessor, etc. The CPU 17 also serves as the main control unit of the well known entire FAX apparatus consisting of the FAX communication circuit 15, etc.

A control program for the CPU 17 is stored in a ROM 18, and data such as image data and control parameters are stored in a RAM 19 which serves as a work area.

A control flag for determining which of the telephone sets 1 and 2 are rung on receipt of an incoming call is stored in the RAM 19 together with registration data such as abbreviated dial data. The content of memory of the RAM 19 is backed up by a backup power supply 25 even if the main power supply is in the off state such as during stand-by.

To perform a well known operation input such as the FAX communication control, the CPU 17 is connected with a console unit 24 consisting of a keyboard, a display, etc.

Each of the above-mentioned relays is controlled by the CPU 17 through a relay controller 20 in accordance with a control parameter stored in the RAM 19.

The control parameter, which meets the operation input from the console unit 24, is stored in the RAM 19 for control.

Although the ringing of the telephone set 1 or 2 can be selected as mentioned above, this selection differs with whether or not automatic switching between telephone and FAX communications is performed on receipt of an incoming call.

The operation in the above configuration will be described referring to FIG. 2. FIG. 2 shows how the incoming call control is performed by the CPU 17.

In an ordinary state of stand-by, the relay 8 is connected with the calling signal detector 21 side, and the relays 9 and 10 are connected with the DC power supply 6 and the calling signal generator 7 side line.

When it has detected an incoming call through the calling signal detector 21 at T1, the CPU 17 switches the relay 8 to the lower side, that is, the communication circuit 15 and the DTMF signal detector 16 side to catch (or occupy) the line 3 (time T2).

In this embodiment, when the partner station transmits a DTMF signal, a telephone set corresponding to the DTMF signal is directly called. That is, when the DTMF detector 16 has detected a DTMF signal (1) (or a DTMF signal (2), and either of which being generated by pressing down the corresponding number key of a telephone set of the partner station, for example) during a period from the time the line has been caught until a first ring back tone (RBT) is transmitted to the partner station, the relay 11 (or the relay 12) is turned on to ring the telephone set 1 (or the telephone set 2) designated by the DTMF signal (period t3) the moment the first RBT is transmitted, as shown by numeral B1.

Also if the DTMF signal is detected before a second ring back tone RBT is transmitted, the bell is rung the moment the second RBT is transmitted (period t4).

On the other hand, if nothing is detected before the second RBT is transmitted, both the relays 11 and 12 will be turned on to ring both the telephone sets 1 and 2 (time T3 and after) the moment the second RBT is transmitted.

It is detected by the hooking detector 4 or 5 in either case whether or not the receiver of each of the telephone sets 1 and 2 has been taken up. When off-hook has been detected, the relay 11 or 12 is first turned off to stop the calling signal. Then the relay 10 (or the relay 9) on the side, in which the off-hook has been detected, is switched to the line side (lower side), and the relay 8 is switched to the upper side to connect the telephone set 1 (or 2) with the telephone line 3 for speech communication.

According to the above embodiment, when a DTMF signal from the partner station is detected in a period for discriminating the voice communication or the FAX communication and a significant DTMF signal from the partner station has been detected, it is possible to connect the line with the corresponding telephone set.

Therefore, the partner station operator can switch this apparatus to the telephone communication immediately, and also select a desired terminal as a voice terminal for the incoming call.

In the above embodiment, a telephone set was selected through the DTMF signals (1) and (2). In addition to this, however, a DTMF signal <0> may be used to shift to a FAX signal (for example, transmit a DIS signal) without calling a telephone set. An apparatus, in which a CNG signal is not transmitted, has been known in the manual transmission procedure so far, and it is also possible to transmit an image from such a transmitter using the above-mentioned configuration.

Two telephone sets were used in the above embodiment, and it goes without saying that the same configuration can be used for systems having more than two telephone sets.

Although a FAX apparatus was shown as an example above, it goes without saying that the above configuration can be executed for any communication apparatus connected with a line together with telephone sets.

Figure 4:
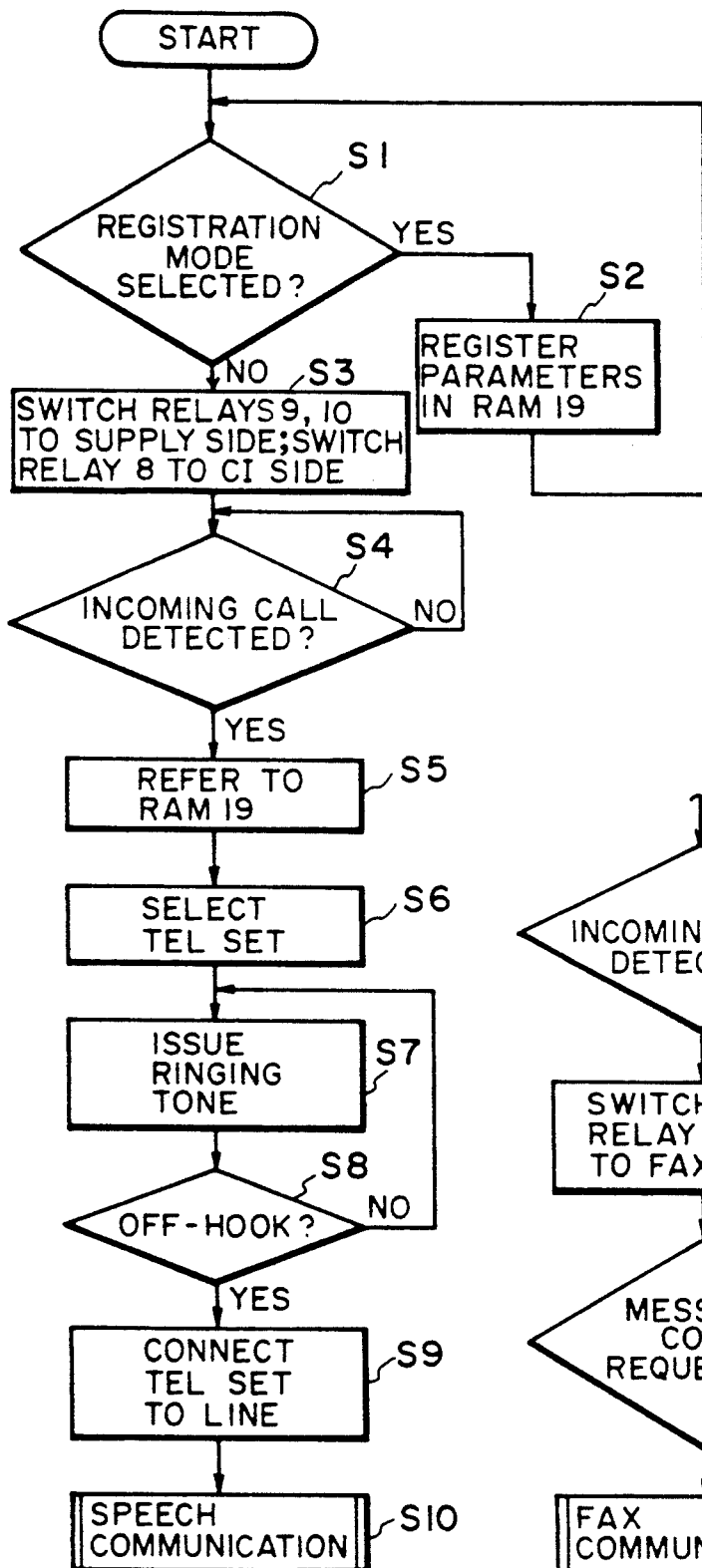
FIGS. 4, 5 and 6 are flow charts showing the incoming call control operation.

FIG. 4 shows a control procedure when automatic switching between telephone and FAX communications is not performed. FIG. 4 shows an incoming call control program of the CPU 17 stored in the ROM 18 in FIG. 1.

Steps S1 to S3 in FIG. 4 show an initialization.

First in the step S1, the operation of the console unit 24 is read, and it is determine whether or not a specified operation has been performed to set a telephone set which rings on receipt of an incoming call.

When the step S1 has been affirmative, the flow proceeds to the step S2 to store in the RAM 19 control parameters for setting a telephone set which rings on receipt of an incoming call in accordance with the operation of the console unit 24.

In the step S3, the relay 8 is connected with the calling signal detector 21 side, and the relays 9 and 10 are connected with the DC power supply and the calling signal generator 7 side.

In a step S4, the calling signal detector 21 detects a calling signal on the telephone line 3. When a calling signal from the exchange has been detected, the flow proceeds to a step S5. When the calling signal has not been detected, the flow returns to the step S1.

In a step S5, control parameters within the RAM 19 which have been set in the step S2 are referred to select a telephone set which rings.

In a step S6, either of the relays 11 and 12 is turned on in accordance with the content of the RAM 19.

In a step S7, the calling signal generator 7 is driven to ring a telephone set which has been selected between the telephone sets 1 and 2 in the steps S5 and S6.

In a step S8, detect from the hooking detectors 4 and 5 whether or not which of the telephone sets 1 and 2 has been off hook. The off hook is detected by detecting whether or not direct current has flowed through the line from the DC power supply 6 by the hooking detectors 4 and 5.

When the hook is off, the calling signal generator 7 stops the bell ringing in a step S9, and connects either of the telephone sets 1 and 2 with the line on the telephone line 3 side through the relay 9 or 10, and then speech communication can be performed in a step S10.

Figure 5:
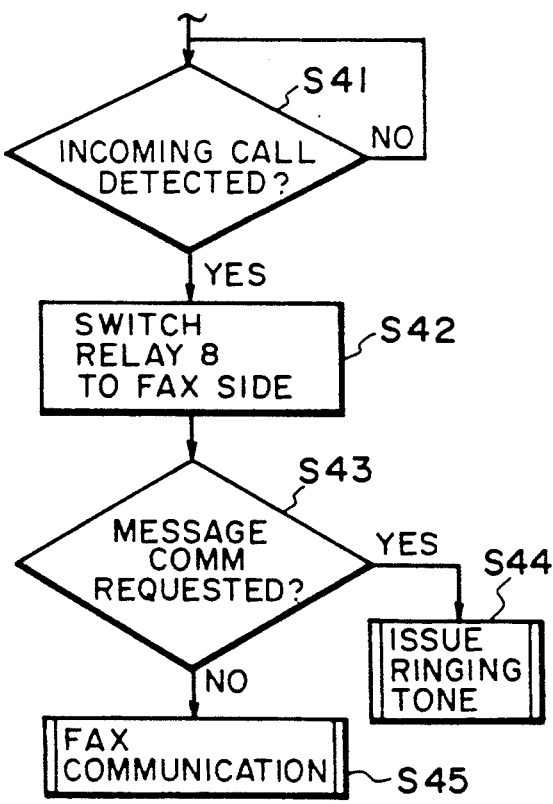

FIG. 5 shows the control procedure when automatic switching between telephone and FAX communications is performed.

The processes in steps S41 et seq. show the incoming signal control in a mode in which automatic switching between telephone and FAX communications is performed after the steps S1 and S2 in FIG. 4.

In the step S41, the relay 8 is connected with the upper side in FIG. 1, and a calling signal is detected by the calling signal detector 21.

After a calling signal has been detected, the relay 8 is connected with the lower side in FIG. 1 in a step S42 to detect using the FAX communication circuit 15 or the DTMF signal detector 16 in a step S43 whether or not the partner station is going to perform a voice communication. This detection is performed by detecting a voice band signal, a FAX signal or a DTMF signal, etc.

When the step S43 has been denied, a well known FAX communication is performed in a step S45.

When the step S43 has been affirmative, the same bell ringing control as in the steps S5 et seq. in FIG. 4 is performed in a step S44, and speech communication is allowed if the telephone set 1 or 2 answers. Also in the step S44, only a telephone set, which has been designated by the console unit 24 beforehand in the same manner as mentioned above, ring.

It is set using the console unit 24 in accordance with a well known procedure which is performed, a procedure in FIG. 4 or another procedure in FIG. 5, that is, whether or not the automatic switching between telephone and FAX communications is performed.

In the selection of a telephone set, which is allowed to ring its bell, by the console unit 24, it is desirable to program beforehand so that setting for inhibiting all telephone sets from ringing cannot be performed.

According to the above configuration, when a telephone set is allowed to ring on receipt of an incoming call irrespective of automatic switching between telephone and FAX communications, it is possible to ring only any one designated among a plurality of telephone sets.

Therefore, it is possible to ring only a telephone set near an operator in charge on receipt of an incoming call, eliminating such a troublesomeness that telephone sets, which have nothing to do with the operator in charge, ring as before.

A FAX apparatus has been shown as an example above. For any communication apparatus, which is connected with a line together with telephone sets, it goes without saying that the above configuration can be executed.

Figure 6:
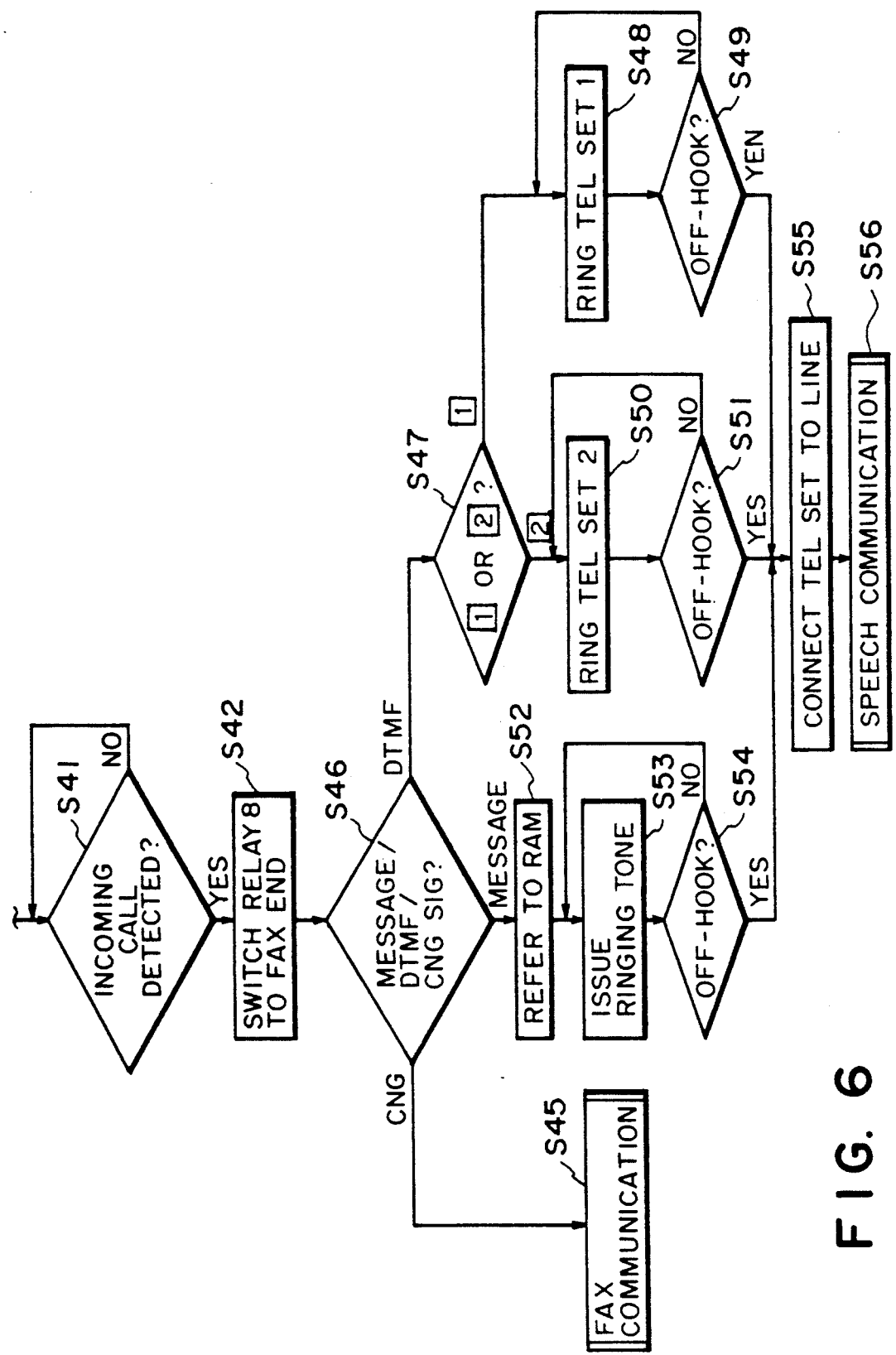

FIG. 6 shows a modified example of the process in FIG. 5. The flow in FIG. 6 is used to perform the above-mentioned control operation in FIG. 2. In FIG. 6, a CNG signal and a DTMF signal as well as a voice signal are detected for a received signal, and the incoming call is controlled in accordance with the result. In this case, it can be controlled from the calling side through the DTMF signal which telephone set should be rung.

After an incoming call has been first detected in the step S41 in FIG. 6, the relay 8 is switched to the FAX side in the step S42, and it is discriminated in a step S46 which a signal received by the line is, a voice signal, a DTMF signal or a CNG signal showing a non-voice terminal. When the received signal is a DTMF signal, it is discriminated in a step S47 whether the received DTMF signal is "1" or "2", and if it is "1", the telephone set 1 is rung in a step S48, and the offhook of the telephone set 1 (operator's answering) is in a step S49.

If the DTMF signal is "2" in the step S47, the telephone set 2 is rung in a step S50, and the offhook of the telephone set 2 is waited in a step S51.

If the signal received in the step S46 is a voice signal, the same control is executed in steps S52, S53, and S54 as in the steps S5, S6, S7 and S8 in FIG. 4. When the operator answers in the steps S49, S51 or S54, the line is connected to the telephone set which has been hooked off in a step S55, and speech communication is allowed in a step S56.

If the signal received in the step S46 is a CNG signal, the same FAX communication as in the step S45 in FIG. 5 is performed.

According to the above control, if the partner station is found to be a FAX apparatus by the detection of the CNG signal, it is possible to securely switch over to FAX communication, and a telephone set, which is allowed to ring, can be designated also from the calling side by communicating a DTMF signal.

The present invention is not limited to the above-mentioned embodiments, but can be applied by modifying in various ways.

I claim:

1. A data communication apparatus comprising:
   first switch means for selectively connecting to a plurality of telephone sets;
   second switch means for selectively connecting a data communication circuit and said first switch means to a telephone line;
   setting means connected to the telephone sets for manually setting, in advance, any one of the telephone sets to be rung in response to an incoming call;
   ringing means connected to the telephone sets for ringing the one of the plurality of telephone sets set by said setting means in response to the incoming call; and responding means connected to the telephone sets for responding to the incoming call by connecting the one of the plurality of telephone sets to said first switch means, when the one of the plurality of telephone sets is rung and off-hooked.

2. An apparatus according to claim 1, wherein said ringing means includes memory means for storing therein information on the one of the plurality of telephone sets set by said setting means, said ringing means ringing the one of the plurality of telephone sets corresponding to the information stored in said memory means.

3. An apparatus according to claim 1, further comprising supply means connected to the telephone sets for supplying DC power to the telephone sets while the telephone sets are disconnected by said first switch means.

4. An apparatus according to claim 1, wherein said ringing means sends a calling signal to the one of the plurality of telephone sets.

5. A data communication apparatus comprising:
connecting means for selectively connecting a data communication circuit and a plurality of telephone sets to a communication line;
setting means connected to the telephone sets for manually setting, in advance, any one of the telephone sets to be rung in response to an incoming call;
ringing means connected to the telephone sets for ringing the one of the plurality of telephone sets set by said setting means in response to the incoming call; and responding means connected to the telephone sets for responding to the incoming call by connecting the one of the plurality of telephone sets to the communication line by said connecting means, when the one of the plurality of telephone sets is rung and off-hooked.

6. An apparatus according to claim 5, wherein said connecting means comprises first switch means for selectively connecting to the plurality of telephone sets, and second switch means for selectively connecting the data communication circuit and said first switch means to the communication line.

7. An apparatus according to claim 5, wherein said ringing means sends a calling signal to the one of the plurality of telephone sets.

8. An apparatus according to claim 5, wherein said ringing means includes memory means for storing information on the one of the plurality of telephone sets by said setting means.

9. An apparatus according to claim 5, further comprising supply means connected to the telephone sets for supplying DC power to the telephone sets while the telephone sets are disconnected from the communication line by said connecting means.

10. An apparatus according to claim 5, wherein said responding means comprises detection means for detecting whether the one of the plurality of telephone sets is off-hooked.

11. An apparatus according to claim 5, wherein said ringing means comprises detecting means for detecting the incoming call from the communication line.

* * * * *